United States Patent [19]

Vallomy

[11] Patent Number: 4,836,732
[45] Date of Patent: * Jun. 6, 1989

[54] METHOD AND APPARATUS FOR CONTINUOUSLY CHARGING A STEELMAKING FURNACE

[75] Inventor: John A. Vallomy, Charlotte, N.C.

[73] Assignee: Intersteel Technology, Inc., Charlotte, N.C.

[*] Notice: The portion of the term of this patent subsequent to Jul. 21, 2004 has been disclaimed.

[21] Appl. No.: 42,208

[22] Filed: Apr. 24, 1987

Related U.S. Application Data

[63] Continuation-in-part of Ser. No. 868,380, May 29, 1986, Pat. No. 4,681,537.

[51] Int. Cl.⁴ ............................................. F27D 1/18
[52] U.S. Cl. .................................... 414/188; 373/79; 373/80; 414/786; 432/134,242
[58] Field of Search ............... 414/150, 152, 153, 154, 414/156, 160, 167, 172, 187, 188, 199, 202, 208, 212, 216, 168, 169, 178, 196, 198, 217, 292, 786; 432/72, 115, 157, 223, 242, 244, 134; 373/79, 80

[56] References Cited

U.S. PATENT DOCUMENTS

| | | | |
|---|---|---|---|
| 1,707,937 | 4/1929 | Gerlach | 373/79 |
| 1,880,768 | 10/1932 | Burt et al. | 432/242 |
| 2,037,554 | 4/1936 | Wagstaff | 414/208 |
| 2,709,529 | 5/1955 | Kleff, Jr. et al. | 414/178 X |
| 3,307,935 | 3/1967 | Lindholm | 414/208 X |
| 3,499,557 | 3/1970 | Walzel | 414/167 X |
| 3,756,430 | 9/1973 | Vandril | 414/172 X |
| 3,900,117 | 8/1975 | Tuovinen et al. | 414/172 X |
| 4,579,524 | 4/1986 | Kraus | 373/79 X |
| 4,681,537 | 7/1987 | Vallomy | 432/242 |

FOREIGN PATENT DOCUMENTS

| | | | |
|---|---|---|---|
| 27507 | 7/1884 | Fed. Rep. of Germany | 414/198 |
| 6224 | of 1908 | United Kingdom | 414/208 |

*Primary Examiner*—David A. Bucci
*Attorney, Agent, or Firm*—Ralph H. Dougherty

[57] ABSTRACT

An apparatus and method for charging a melting furnace having a charging opening in its sidewall, in which a closed housing contains a vibrating pan having an intergal discharge chute adapted to extend into the charging opening in the furnace sidewall; and a truck-mounted carriage for moving the charging apparatus into the charging opening of the furnace and removing the apparatus to a position remote therefrom. A method for feeding the furnace over a predefined area, and continuously feeding the furnace during all phrases of operation, including slagging and tapping, is also disclosed.

8 Claims, 9 Drawing Sheets

METHOD AND APPARATUS FOR CONTINUOUSLY CHARGING A STEELMAKING FURNACE

CROSS REFERENCE TO RELATED APPLICATION

This application is a continuation-in-part of co-pending application Ser. No. 868,380 filed May 29, 1986 now U.S. Pat. No. 468,537.

BACKGROUND OF THE INVENTION

This invention relates to an apparatus and method for feeding a metal refining furnace, and more particularly to a continuous feeding or charging mechanism for an electric arc steelmaking furnace.

Generally, the operation of an electric arc steelmaking furnace has been an intermittent operation, wherein the sequence followed is: charging of steel scrap and/or direct reduced iron, pig iron, slag formers and alloying elements; ignition or establishment of an electric arc between the electrodes in the furnace to create melting conditions for melting the charge and forming a molten metal bath covered by a molten slag; refining for a period of time during which the molten metal portion of the bath is refined to form steel having a desired composition and quality; and periodically raising the electrodes to remove them from contact with the bath and interference with the tapping procedure; then tapping the molten metal. In addition, slag can be removed by a slagging, or slag-off, operation as required.

Although this invention is shown and described in connection with an electric arc steelmaking furnace, it will be readily apparent that any electric powered steelmaking furnace, including but without limitation, fixed or tilting alternating current electric arc furnaces, plasma furnaces, DC furnaces and induction furnaces, could be substituted for an electric arc steelmaking furnace with similar results. In the steelmaking practice known as "continuous charging" or "continuous melting", charge or feed materials are introduced to a furnace during the charging, melting and refining periods, then charging is interrupted and power input is interrupted for the tapping procedure. In U.S. Pat. No. 4,543,124, issued Sept. 24, 1985, an electric furnace operation was disclosed which allowed continuous operation without interruption of either charging or power input during the tapping procedure.

The procedure described above includes segregating prepared scrap, preheating prepared scrap, then feeding the scrap, direct reduced iron or other charge materials to an electric arc steel-making furnace. This was accomplished by continuous feed means, disclosed as a charging conveyor which passes through a refractory tunnel, then into the furnace. In order to feed scrap continuously, it is advantageous to charge through the sidewall of the electric furnace. Small particles, such as direct reduced iron can be fed through the furnace roof.

I have invented a method and apparatus for feeding an electric arc steelmaking furnace, which incorporates continuous preheating and feeding, and results in an increase in productivity, and reduced operating costs.

The present invention provides means for charging materials from a conveyor, such as disclosed in U.S. Pat. No. 787,959, filed Oct. 16, 1985, now U.S. Pat. No. 4,609,400, into an electric arc steelmaking furnace having a charging opening in its sidewall. The apparatus is a connecting or charging car, which includes a vibrating pan which also acts as a chute within an enclosed chamber, which chamber can function as a combustion chamber. A chute portion of the apparatus protrudes into the furnace sidewall opening, and need not be removed when tilting the furnace for slagging or tapping. The chute and pan are preferably rotatable about a vertical axis through an arc of about 20°.

Within the furnace sidewall, and preferably incorporated into the furnace shell, is an inclined furnace feed chute, which further carries feed materials past the sidewall into the furnace.

When connected between a charge preheater and an electric furnace, the charging car chamber functions as a gas-tight connection between the furnace, which must be allowed to tilt about 5° toward the slag door and 10° toward the tapping spout, and the preheater which is stationary.

The charging car functions as a combustion chamber with a burner of variable air-fuel ratio to control oxygen contained in off gas from the furnace. It can direct the furnace off gas to the combustion chamber or divert it to a by-pass. It increases the feeding rate of the scrap delivered by the preheater, spreading it and therefore increasing heat transfer. It decreases the impact of the heavier scrap when reaching the steel bath by decreasing the length of the chute.

The vibrating pan follows the furnace when tilting minus 5° and plus 0°, allowing constant power on during the slagging and tapping procedures. The vibrating pan oscillates continuously at low speed to improve the scrap feed distribution when the furnace is in the vertical position during most of the tap-to-tap cycle.

The charging, or connecting, car can be disengaged from the furnace when the furnace is drained at the end of the campaign, or when the furnace operates in conventional (non-continuous) mode, so that the furnace off gas by-passes the preheater directly to a gas cleaner.

The charging car apparatus is movable into and out of the operative position, and is preferably track mounted.

Alternatively, the charging car, or connecting unit, carries a generally horizontal, straight vibrating pan, in the form of a channel, which is particularly advantageous when utilized with a tilting furnace, such as a tilting or rocking electric arc furnace. In this embodiment, the receiving chute in the furnace is optional, as the pan can discharge feed materials directly into the metal bath or onto the chute, which can be inclined to an angle not exceeding 40 degrees from the horizontal, preferably at least 20 degrees, and having an optimum angle of about 35 degrees. In this embodiment, a charging opening is provided in the furnace sidewall, the pivotal axis of the furnace being located within or closely adjacent the charging opening.

OBJECTS OF THE INVENTION

Accordingly, it is the principal object of the present invention to provide apparatus for continuously feeding of charge materials through the side wall of an electric powered melting furnace.

It is a further object of this invention to provide a feed chute for an electric arc furnace which can be moved from the operating position when required.

It is also an object of this invention to provide a feed apparatus for an electric arc furnace which is mounted for movement between defined limits.

It is also an object of this invention to provide a feed chute for an electric arc furnace which includes a gas-tight enclosure between a stationary charge preheater and a tiltable furnace It is another object of this invention to provide an enclosed feeding means for an electric furnace which acts as a combustion chamber and preheater.

It is another object to provide a method of feeding an electric arc furnace which will feed materials of different mass and cause them to be moving at approximately the same speed upon reaching the bath within the furnace.

It is another object to provide a method of continuously feeding an electric melting furnace wherein the feed chute spreads the charge materials over a predetermined area within the furnace.

BRIEF DESCRIPTION OF THE DRAWINGS

The foregoing and other objects will become more readily apparent by referring to the following detailed specification and the appended drawings in which.

DETAILED DESCRIPTION

Figure 1:
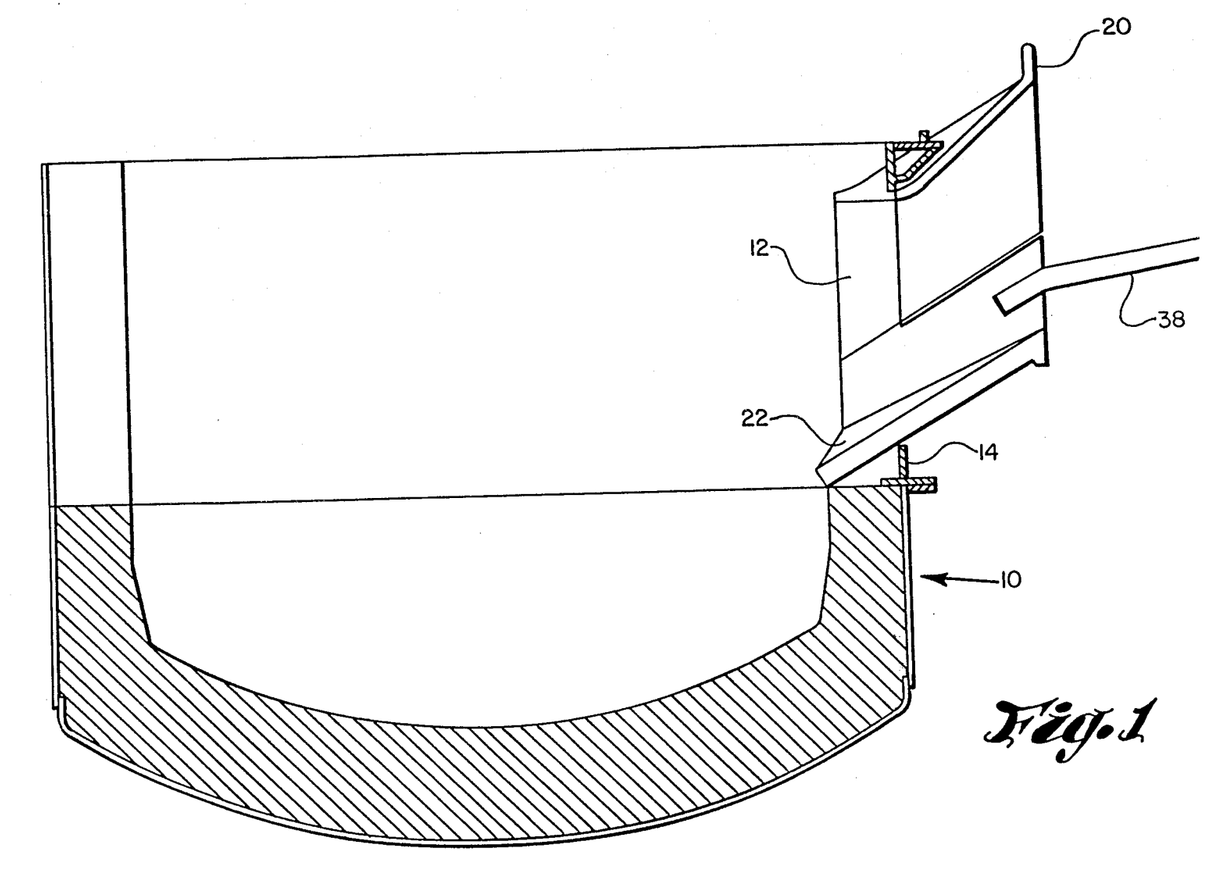
FIG. 1 is a cross section of a steelmaking furnace adapted for use with the present invention.

Referring now to the drawings, an electric arc furnace 10 has a charge opening 12 in its sidewall 14. The sidewall opening 12 holds a flange 20, which lines the entire opening 12 and may extend from the sidewall 14 as shown. The flange 20 is preferably water-cooled. A feed chute 22 extends into the furnace from the flange 20.

The connecting charge car apparatus 24 includes a support frame 26 mounted on a carriage 27 having wheels 28 engageable with rails 30, an upstanding housing 34 mounted on the support frame 26, and a pivotally mounted material-receiving pan 36 mounted on a vibrating or driving unit and within the housing, which carries an integral discharge chute 38 on one side. The discharge chute is adapted to extend into the charging opening 12 in the furnace sidewall. The housing 34, which is of two pieces, upper housing 34A and lower housing 34B, has an opening 40 for chute 38, and a second opening 42 in its sidewall for receiving a material conveying chute or conveyor 44.

Beneath and connected to the material-receiving pan 36 is a vibrating mechanism 54 for vibrating both the pan 36. and the inclined discharge chute 38. A circular track 56 is fixed to the carriage 27, and is engaged by wheels 58 mounted on frame 26. Oscillating drive means, shown in FIG. 4 as a reciprocal drive cylinder 59 attached to the housing 34 and carriage 27, moves the pan 36 and chute in arcuate motion through an arc of from 5 to 20 degrees.

A mating flange 60, curved to match the radius of housing 34, and having a charging opening 62 therethrough, is fixed to the housing 34, and carries a flat flange 64 for mating with flange 20 of the furnace.

Figure 4:
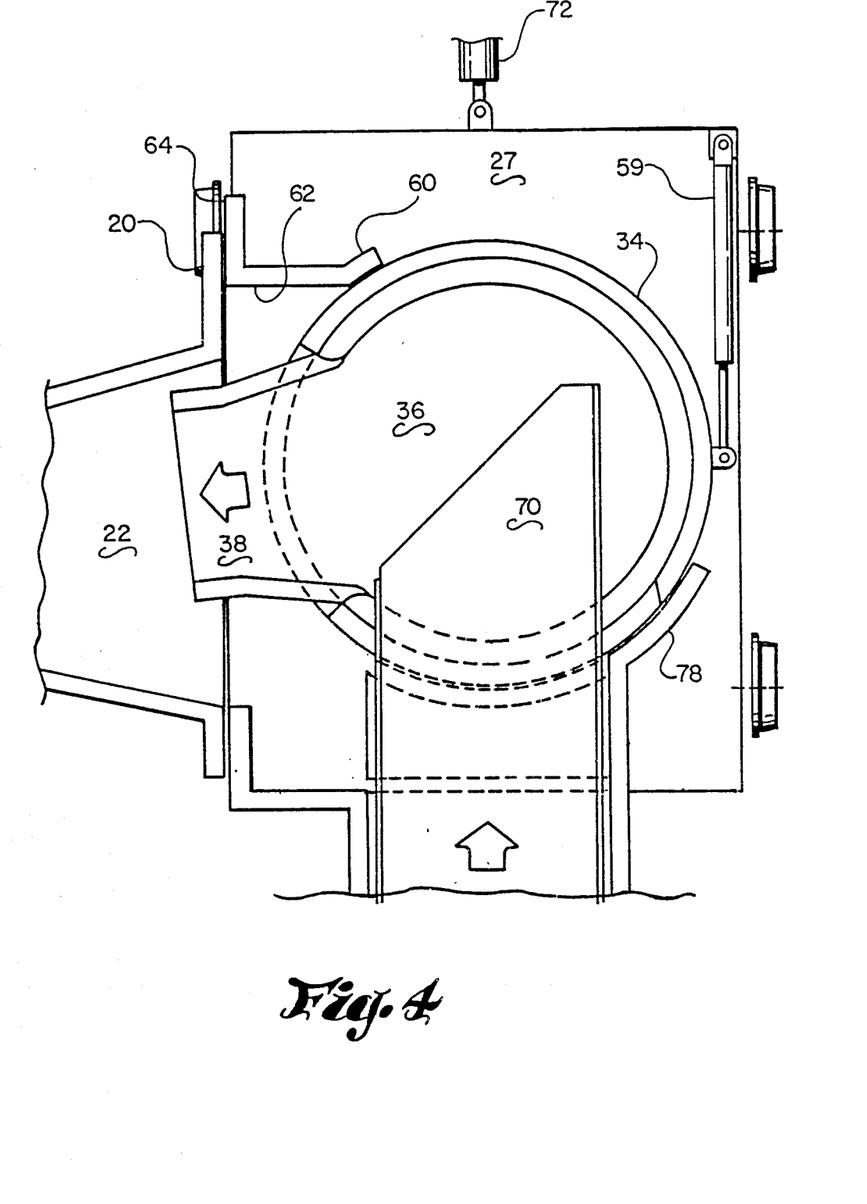
FIG. 4 is a plan view of the invented apparatus, with the top removed, showing a 90° feed arrangement.
Figure 5:
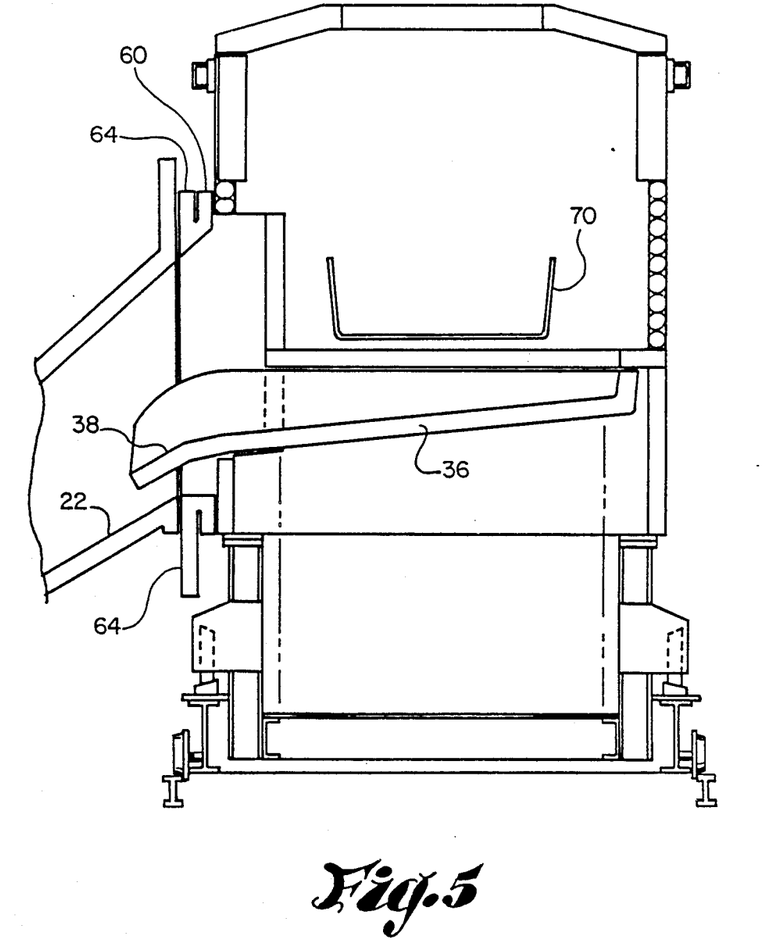
FIG. 5 is a vertical cross section of the alternative embodiment of FIG. 4.
Figure 6:
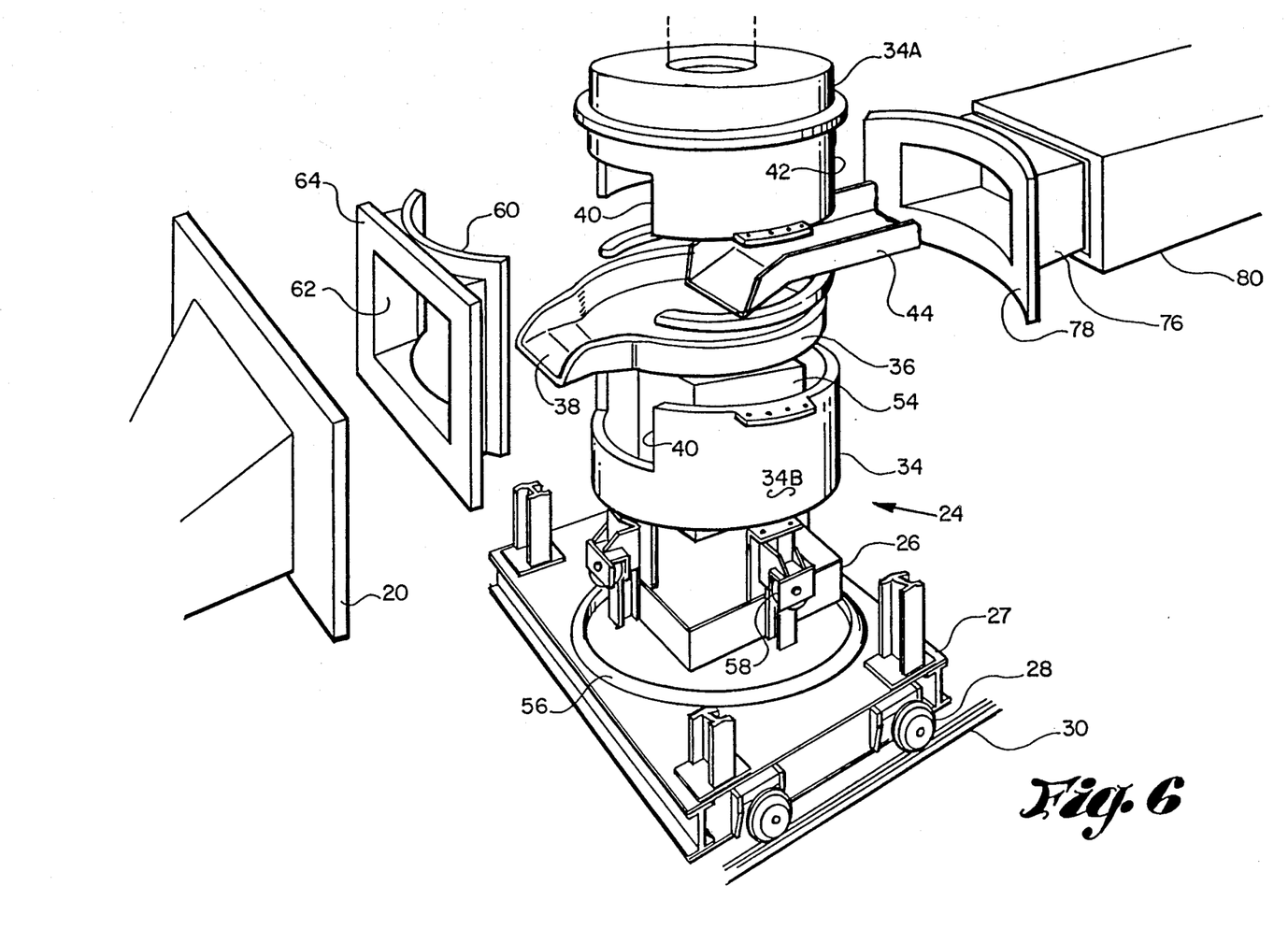
FIG. 6 is an exploded isometric view of the charging apparatus of the invention.

As shown in FIGS. 4 and 5, the invented charging car has an entry chute 70 positioned about 90° to the delivery chute 38 of the vibrating pan 36. The carriage 27 is oriented for movement normal to the furnace flange 20. Carriage drive means, such as retractable piston 72, is attached to the carriage 27 and to a fixed point 73. The piston can be operated hydraulically, or by any other desired means.

A retractable transition element 76 carries a flange 78 for mating with housing 34 to effect a gas-tight seal. The end of transition element 76 opposite the flange 78 extends into and is movable in telescoping relation to charge preheating chamber 80. Pneumatic cylinders, or other motive means, may be attached to flange 78 assure proper alignment and movement of the retractable element 76. Alternatively, flange 78 is attached to or carried by a frame member of car 24. In disengaging the charging car from the operative position, the housing 34 pushes the telescoping element 76 into the housing of charge preheater 80.

As shown in FIGS. 4 and 5, an alternative embodiment of the invented charging car has an entry chute 70 positioned at about a right angle to the delivery chute 38 of the vibrating pan 36. This necessitates only minor modifications in the connecting car apparatus 34. The carriage is oriented for movement parallel to the furnace flange 20 in this embodiment. The carriage drive means, retractable piston 72, is attached to the carriage 27 and to a fixed point, not shown. Alternatively, the entry chute 44 or 70 and its associated sidewall opening 42 can be oriented at any angle to the delivery chute 38 from about 90° to 180°. The orientation of the tracks 30 and wheels 28 are such that they are substantially aligned with the entry chute 44 or 70.

When engaging the charging car of the embodiment of FIGS. 4 and 5, the vibrating pan 36 and discharge chute 38 must be rotated to a position wherein the chute 38 will not impact the flange 20 of the furnace sidewall opening while positioning the charging car 24. The chute is then rotated into the opening as soon as the nearer edge of the chute has reached the opening. Disengaging the car requires an opposite action, commencing rotation of the pan, then initiating movement of the car. At any alternative angle of entry chute from 90° to about 150°, such rotation of the pan may be required during positioning and removal of the car.

A wear plate 84 (see FIG. 3) can be provided on the working surface of either the inclined chute 38 or the pan 36, or both, if desired.

Figure 2:
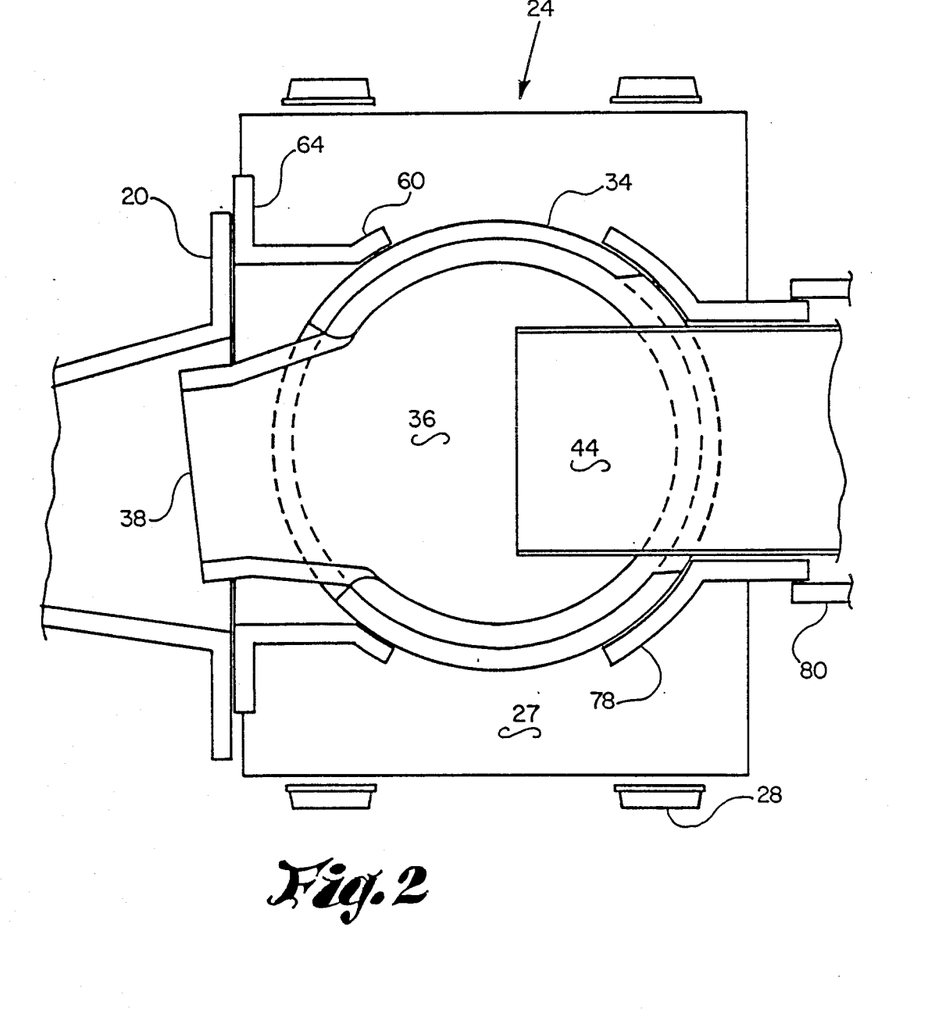
FIG. 2 is a plan view of an alternative embodiment of the invention, with the top removed, showing a generally straight line feed arrangement.
Figure 3:
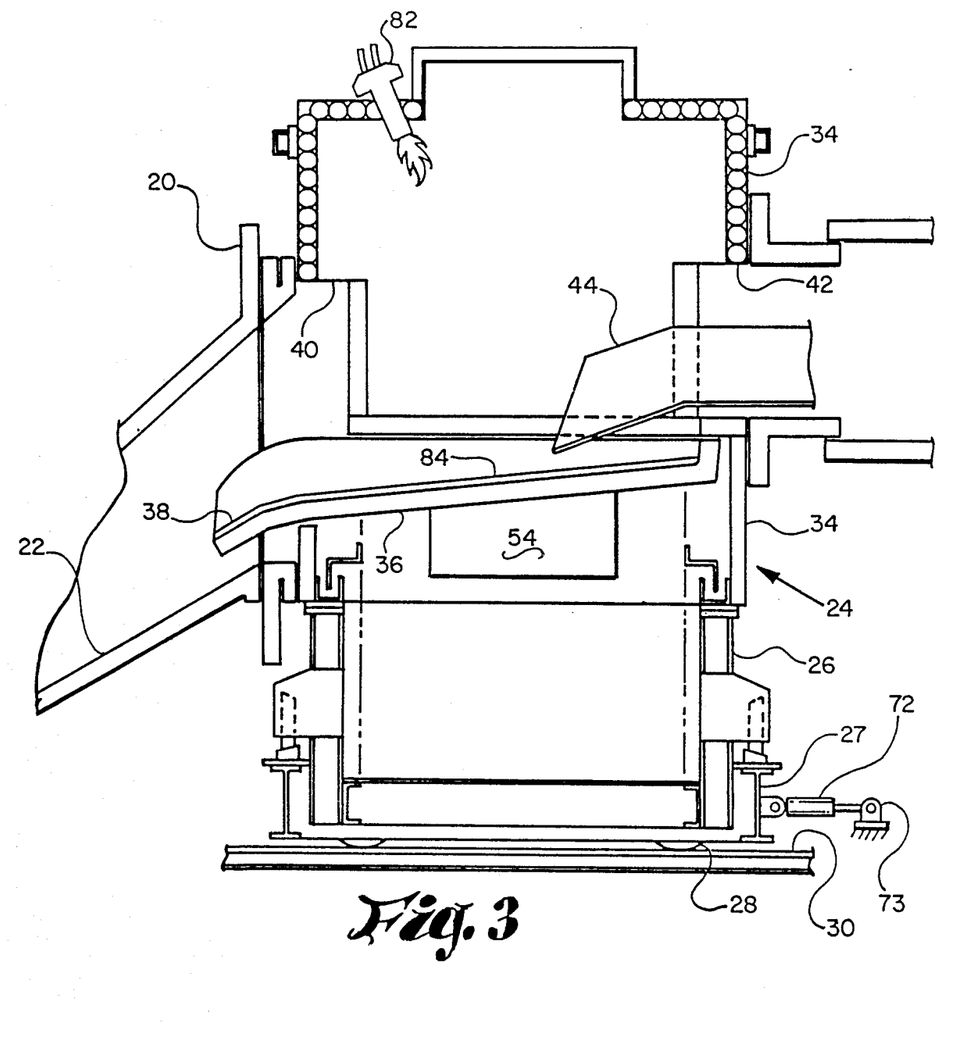
FIG. 3 is a vertical cross sectional of the invented charging apparatus of FIG. 2.

In operation of the embodiment of FIGS. 2 and 3, the connecting car or charging apparatus 24 is positioned adjacent the sidewall opening 12 of furnace 10, with flange 20 and flange 64 abutting to form a seal. The charging car 24 is positioned with wheels 28 against a pre-positioned stop, and a removable stop is then placed against its rear wheels. The charging conveyor 44 is activated, charge materials enter the housing 34 through opening 42, drop onto the vibrating pan 36, are moved by vibrating motion and gravity through chute 38 onto chute 22, then into the furnace, whereby the furnace is continuously charged.

Figure 7:
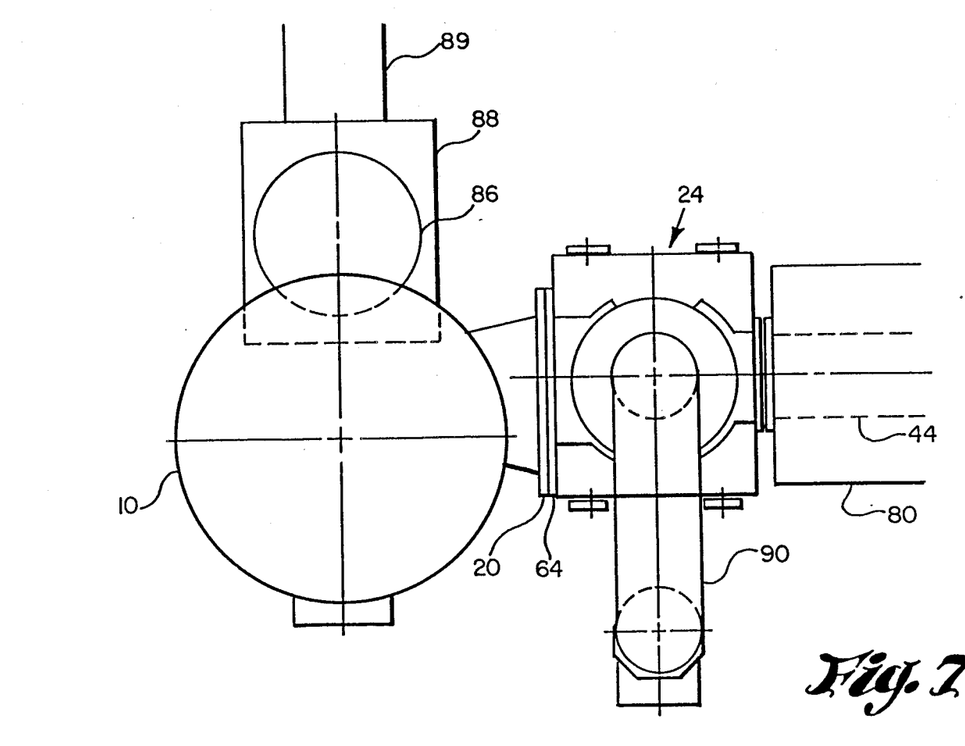
FIG. 7 is a plan view of an electric furnace, the invented connecting car apparatus, and a charge preheater connected in series.

The furnace wall opening 12 is sufficiently large, as shown in FIGS. 1 and 7, so that up to about a 15° tilt in either direction will not necessitate removal of the inclined charging chute 38. The furnace tilts 5 degrees back to draw off the slag, and 10 degrees forward to tap the molten metal, so the charging apparatus need not be removed or repositioned for either the slagging or tapping procedure.

A slight gap is left between the flange 64 of the charge apparatus and the flange 20 of the furnace to reduce wear.

During charging, the pan and charging chute are oscillated slowly through an arc of from 5 to 20 degrees, but generally about 12°, to drop the materials being charged into a wider area onto chute 22 and promote better melting, as the materials will be better spread across the chute 22 upon entry into the furnace.

The angle and length of the chute 22 controls the speed and impact of all materials to the bath, so that they will enter the bath at approximately the same speed, regardless of whether materials of high mass such as large scrap, or materials of light mass such as small pellets are being charged, which can occur at the same time. The angle of chute 22 is about 20° to 40° from the horizontal, but is preferably 35°.

An electric furnace is normally pivotal about a horizontal axis. Many electric furnaces are pivotal about an off-center tilting axis. The present invention is particularly useful with the latter type of tilting furnace.

The chamber formed by housing 34 acts as a combustion chamber for the off gases from the furnace 10. The upper housing 34A is refractory lined, and has a water-cooled portion, which can also be refractory lined. One or more burners 82 (as shown in FIG. 3) may be provided in the housing wall or any opening in the housing to control combustion within the combustion chamber defined by the housing 34 to fully or partially burn the off gases as desired.

As shown in FIG. 7, electric arc steelmaking furnace 10 is fed by covered conveyor 44 within chamber 80, through charging car 24. For tapping purposes, a steel ladle 86 is provided on a transfer car 88 movable along track 89 for moving ladle 86 into and out of tapping, ladle metallurgy, and pouring positions. The ladle can be teemed directly into a continuous caster, not shown, if desired. Gas can be removed from the charging car chamber through gas pipe 90 to a gas cleaner, or to a location where its heat or its fuel value can be utilized, as in a preheater.

ALTERNATIVE EMBODIMENTS

Figure 8:
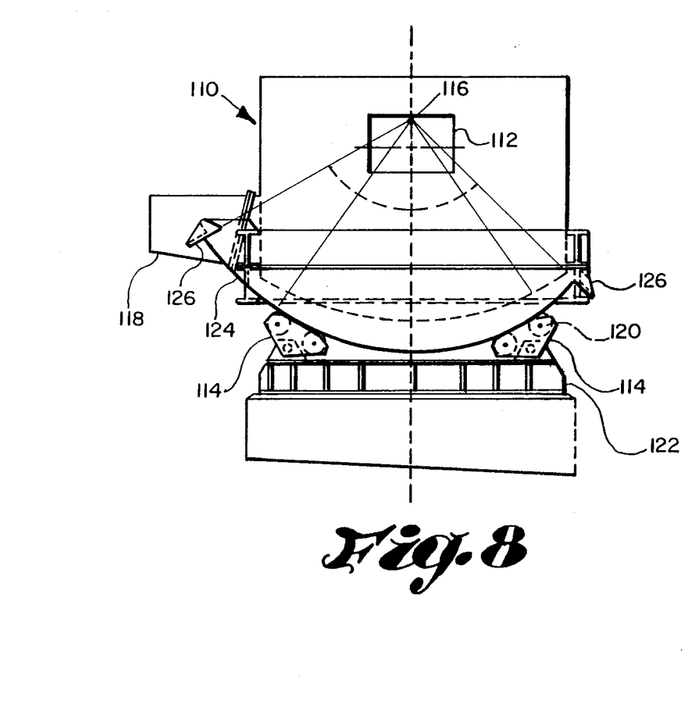
FIG. 8 is a side elevational view of a tiltable electric arc furnace in accordance with an alternative embodiment of the invention.
Figure 9:
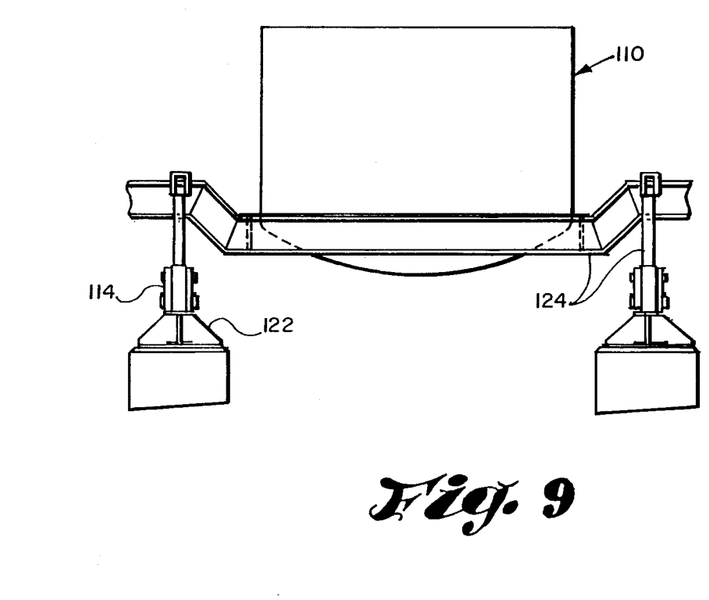
FIG. 9 is an front elevational view of the tiltable arc furnace of FIG. 8.

As shown in FIG. 8, a tilting electric arc furnace 110, having a charging opening 112 in its sidewall, is mounted on roller assemblies 114 for rotation about the furnace axis 116, in order to pour refined steel from the furnace pouring spout 118. The roller assemblies, including rollers 120, are mounted on a support frame 122. The tilting furnace 110 is mounted on a support frame assembly 124, which is itself mounted on rollers 120, and which has stops 126 thereon to limit the angle of tilt to any desired angle, preferably to about 25 degrees forward or into the pouring position, and to about 10 degrees rearward, which can be the slagging or slag-off position. The charge opening is advantageously provided with a flange 130 (best seen in FIGS. 10 and 11) which is preferably water-cooled, and acts in the same manner as flange 20 of FIG. 1.

Figures 10, 11:
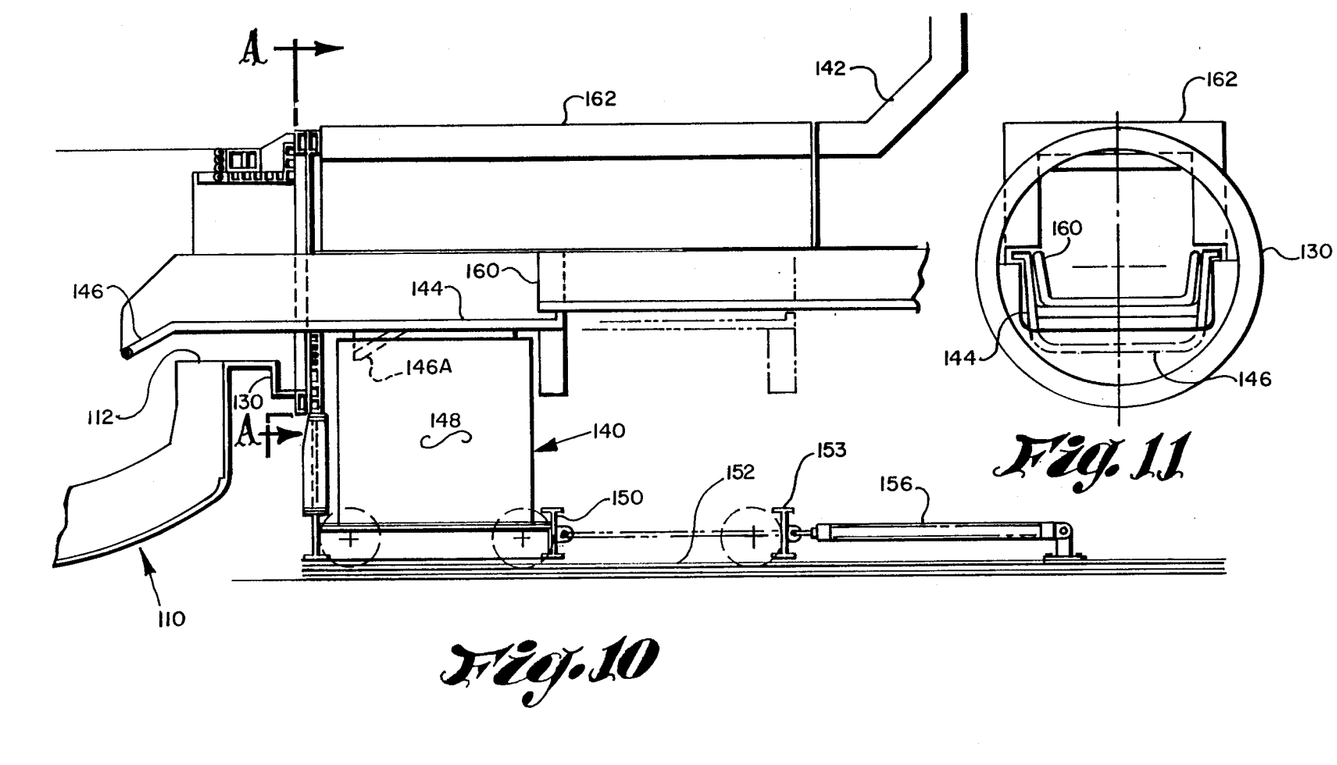
FIG. 10 is a side sectional view of a portion of the arc furnace of FIG. 8, showing alternative charging equipment, including a vibrating feed pan mounted on a mobile connecting car.
FIG. 11 is a sectional view of the charging apparatus of FIG. 10 taken along the line A—A of FIG. 11.

As shown in FIGS. 10 and 11, a connecting unit 140 between charge preheating unit 142 and the tilting furnace 110 carries a vibrating pan 144 having an inclined discharge ramp 146 at its exit end. The vibrating pan is mounted on a vibrating unit 148 on the support frame structure of a track mounted tram car 150, which is situated o track 152. Two or more fluid-operated cylinders 156 or other motive means are attached to the tram to provide movement of the connecting unit to the operating position with the vibrating pan extending through the sidewall into the furnace and to the standby position remote from the furnace sidewall, indicated by reference numeral 153, with the retracted vibrating pa discharge ramp in the position indicated as 146A. Alternatively, movement of the connecting unit may be provided by an engine or other source of power. The track 152 may have a stop, not shown, to prevent the vibrating pan from extending too far into the furnace 110.

The vibrating pan 144 is movable beneath charging conveyor 160 extending from preheating chamber 142, during the periods of activation of motive means 156. An independently supported cover 162, which is preferably refractory lined, is arranged above the vibrating pan 144, and may be removed if necessary for access to the vibrating pan. Because vibrating pan 144 may extend into furnace 110 further than the discharge chute 38, feed chute 22 in the furnace opening is optional in this embodiment.

In operation of the embodiment of FIG. 10, the connecting unit 140 is propelled against a stop, not shown, and a removeable stop may be placed against its rear wheels. Generally, the force of the hydraulic cylinders is sufficient to hold the unit 140 in the operating position. The vibrating pan is activated and the furnace is charged. Because the tilting axis of the furnace is within the charging opening in the sidewall, and generally aligned with the longitudinal centerline of the vibrating pan, a 25 degree tilt in either direction will not necessitate removal of the vibrating pan from the furnace opening. When necessary to remove the vibrating pan for maintenance of either the connecting unit or the furnace, the removable wheel stop, if any, is removed, and the connecting unit 140 is propelled away from the furnace by retraction of the hydraulic cylinders 156, the upper flanges of the vibrating pan passing beneath downwardly-extending sides of the cove 162.

A longitudinal seal, such as a water seal, not shown, prevents escape of hot gases from the chamber defined by the cover 162 and the vibrating pan 144. The cover 162 and the flange 130 act together with the vibrating pan 144 to provide a tunnel-like pre-heater for passage of the hot furnace off-gases, which will impart heat to the charge materials in the vibrating pan. Close spacing of all components in faying relation provide gas sealing of the system, which is kept under a slightly negative pressure to prevent escape of hot gases.

Although it is preferable to utilize a charging car or connecting unit when feeding a furnace from a charge preheater, it is possible in some applications to omit the car from the apparatus and feed charge materials directly from the water-cooled end of the charge preheater conveyor 160 into the furnace.

SUMMARY OF THE ACHIEVEMENTS OF THE OBJECTS OF THE INVENTION

It is readily seen from the foregoing that I have invented a new and useful connecting car charging apparatus which is particularly well suited for the continuous charging of an electric arc steel making furnace, which can be moved from the operating position when required, which includes a gas-tight enclosure, and which is capable of acting as a preheater. I have also provided a method of continuously feeding an electric arc furnace which will feed materials of different mass at approximately the same speed to the furnace bath, and wherein the feed chute spreads the charge materials over a predetermined area within the furnace. An alternative embodiment provides straight charging to a tilting electric arc furnace with substantially the same advantages as set forth above.

What is claimed is:

1. Apparatus for charging a tilting electric melting furnace, which is tiltable about a horizontal tilting axis, from a charging conveyor, the melting furnace having a charging opening in its sidewall, the horizontal tilting axis of the furnace passing through such charging opening, such charging apparatus comprising:
   a track mounted carriage;
   a support frame mounted on said carriage;
   vibrating means mounted on said support frame;
   an elongated vibrating pan mounted on said vibrating means;
   said vibrating pan having a discharge end adapted to extend into the charging opening in the furnace sidewall;
   means for effecting a gas-tight seal between said apparatus and said furnace;
   means for moving said discharging end of the vibrating pan into the charging opening of said furnace and to a position remote therefrom;
   an independently mounted cover above said vibrating pan, and means for effecting a gas-tight seal between said vibrating pan and said cover;
   whereby said furnace is capable of tilting about said horizontal tilting axis while said vibrating pan is situated within said charging opening.

2. Apparatus according to claim 1 wherein said means for moving said apparatus is at least one fluid operated cylinder connected to said track-mounted carriage.

3. Apparatus according to claim 1, wherein said means for effecting a gas tight seal between said apparatus and said furnace comprises:
   a flange fixed to said furnace surrounding said charging opening;
   a mating upper flange fixed to said cover; and
   a mating lower flange fixed to said support frame, said upper and lower flanges engaging said furnace flange.

4. Apparatus according to claim i including means for effecting a gas-tight seal between said apparatus and an adjacent charge preheater.

5. Apparatus according to claim 1 wherein the track on which said carriage is mounted is aligned substantially perpendicular to the charging opening in said furnace.

6. A method for continuously charging a melting furnace through its sidewall, comprising:
   receiving heated charge materials in an enclosed housing;
   continuously vibrating said charge materials within the housing; and
   discharging said materials from the housing into the furnace onto a chute which receives said materials and discharges them at an angle from the horizontal of from 20 to 40 degrees.

7. A method according to claim 6 wherein the angle of discharge is about 35°.

8. A method according to claim 6 further comprising removing off gases from the furnace into the interior of said housing, thereby heating charge materials therein.

* * * * *

UNITED STATES PATENT AND TRADEMARK OFFICE
CERTIFICATE OF CORRECTION

PATENT NO. : 4,836,732
DATED : June 6, 1989
INVENTOR(S) : John A. Vallomy

It is certified that error appears in the above-indentified patent and that said Letters Patent is hereby corrected as shown below:

Column 2, line 28, change "0°" to -- 10° --.

Column 3, line 2, change "furnace" to -- furnace. --.

Column 4, line 3, change "36." to -- 36 --.

Column 6, line 12, change "o " to -- on --.

Column 6, line 18, change "pa" to -- pan --.

Column 6, line 53, change "cove" to -- cover --.

Column 8, line 19, change "i " to -- 1 --.

Signed and Sealed this

Nineteenth Day of July, 1994

*Attest:*

BRUCE LEHMAN

*Attesting Officer*   Commissioner of Patents and Trademarks